United States Patent [19]

Lewis

[11] Patent Number: 4,965,054
[45] Date of Patent: Oct. 23, 1990

[54] PROCESS OF EXTRACTION OF GALLIUM FROM AQUEOUS SOLUTIONS THEREOF

[75] Inventor: Roy G. Lewis, Tucson, Ariz.

[73] Assignee: Henkel Corporation, Ambler, Pa.

[21] Appl. No.: 388,261

[22] Filed: Aug. 1, 1989

[51] Int. Cl.$^5$ ............................................. C01G 15/00
[52] U.S. Cl. ............................ 423/112; 423/DIG. 14; 204/105 R
[58] Field of Search ...................... 423/112, DIG. 14; 75/101 BE

[56] References Cited

U.S. PATENT DOCUMENTS

| | | | |
|---|---|---|---|
| 3,637,711 | 1/1972 | Budde et al. | 260/289 |
| 3,971,843 | 7/1976 | Helgorsky et al. | 423/112 |
| 4,169,130 | 9/1979 | Helgorsky | 423/112 |
| 4,193,968 | 3/1980 | Sullivan et al. | 423/DIG. 14 |
| 4,241,029 | 12/1980 | Helgorsky et al. | 423/112 |
| 4,372,923 | 2/1983 | Helgorsky | 423/112 |
| 4,404,174 | 9/1983 | Leveque et al. | 75/101 BE |
| 4,485,076 | 11/1984 | Bauer | 423/112 |
| 4,587,111 | 5/1986 | Wynn | 423/112 |
| 4,844,808 | 7/1989 | Sabot | 423/112 |

FOREIGN PATENT DOCUMENTS

| | | | |
|---|---|---|---|
| 0234319 | 2/1987 | European Pat. Off. | 423/112 |
| 3045334 | 2/1988 | Japan | 423/112 |

OTHER PUBLICATIONS

"Analysis of the Halide Complexes of Fe(III), Co(II), Ga(III) and In(III) Extracted from Aqueous Chloride Media by High Molecular Weight Substituted Alkyl Ammonium Compounds", by Good & Srivastava *Journal Inorganic Nuclear Chemistry*, 27, pp. 2429-2436, (1965).
"Extraction of In(III) and Ga(III) from Aqueous Chloride Media by Long Chain Alkyl Amines and Quaternary Salts", by Good & Hollard, *Journal Inorganic Nuclear Chemistry*, 24, pp. 321-327, (1964).
Solvent Extraction and Ion Exchange, 2(1), 45-60 (1984).
Hydrometallurgy, 16 (1986) p. 315-324.
Journal Inorg. Nucl. Chem., 27, pp. 2429-2436 (1965).
Solvent Extraction and Ion Exchange, 2(2), 201-212 (1984).
Hydrometallury, 4 (1979), pp. 285-290.

*Primary Examiner*—Robert L. Stoll
*Assistant Examiner*—Steven J. Bos
*Attorney, Agent, or Firm*—Ernest G. Szoke; Wayne C. Jaeschke; Patrick J. Span

[57] ABSTRACT

An improved process of extraction of gallium from aqueous solutions thereof to provide for recovery of the gallium in a very pure form, either as the metal or as the hydroxide. The process involves two extraction steps and two strip or scrub steps employing different extractant in each extraction and an acidic strip step after the first extraction and a basic strip step after the second extraction. The first extraction involves the use of 8-hydroxyquinoline extractant while the second extraction employs an amine extractant. The extraction process is a liquid-liquid process in which the water insoluble extractant compounds are employed in a water insoluble, water immiscible, organic solvent.

20 Claims, 1 Drawing Sheet

PROCESS OF EXTRACTION OF GALLIUM FROM AQUEOUS SOLUTIONS THEREOF

BACKGROUND OF THE INVENTION

1. Field of the Invention

This invention relates to an improved process of extraction of gallium from aqueous solutions thereof to provide for recovery of the gallium in a very pure form either as the metal or as the hydroxide. In particular the process involves a double extraction and strip or scrub stages employing a different extractant in each extraction stage and an acidic strip stage after the first extraction and a basic strip stage after the second extraction. The first extraction involves the use of an alkylated 8-hydroxyquinoline extractant while the second extraction employs an amine extractant. The extraction process is a liquid-liquid process in which the water insoluble extractant compounds are employed in a water insoluble, water immiscible, organic solvent. Due to the immiscibility the organic phase can be separated from the aqueous solutions treated.

2. Description of Related Art

Extraction of gallium from aqueous solution by liquid-liquid extraction systems has been carried out in the past. U.S. Pat. No. 3,637,711 describes the recovery of metal values from aqueous solutions with an organic solvent containing hydrocarbyl substituted 8-hydroxyquinolines such as allylbenzyl or $\beta$-alkenyl substituted 8-hydroxyquinolines. While directed primarily to the recovery of copper, gallium is one of the metals listed for recovery.

U.S. Pat. No. 3,971,843 describes the recovery of gallium present in aqueous solution which may also contain a compound of aluminum and sodium. In this process the aqueous solution is contacted with a substituted hydroxyquinoline in an organic solvent immiscible with water and under highly alkaline conditions whereby gallium, sodium and aluminum, when present, are extracted. The gallium can be separated from the sodium and aluminum by contacting the organic phase with a dilute solution of an inorganic acid to remove sodium and aluminum from the organic phase and then contacting the organic phase with a more concentrated solution of inorganic acid to remove the gallium.

U.S. Pat. No. 4,169,130 describes the recovery of gallium values from highly basic aqueous solutions thereof, especially from sodium/aluminum liquors of Bayer process origin, by liquid/liquid extraction with a water immiscible organic phase comprising an organic solvent and a dissolved, water insoluble substituted hydroxyquinoline. The recovery is characterized in that at least the step of extracting the gallium values is conducted under an inert atmosphere.

In U.S. Pat. No. 4,241,029 gallium values are recovered from the basic aqueous solutions thereof, especially from sodium/aluminum liquors of Bayer process origin, by liquid/liquid extraction with a water immiscible organic phase comprising an organic solvent and dissolved therein, an organic solvent soluble, substituted hydroxyquinoline and an organic carboxylic acid compound.

In a paper, Solvent Extraction Ion Exchange, 2, 1984 pp. 45–69, "The Extraction of Zn II, Pb II and Gallium III from Alkaline Solutions by Alkylated Hydroxyquinoline. T. Sato, T. Nakamura and H. Oishi, the extraction of $Zn^{+2}$, $Pb^{+2}$ and $Ga^{+3}$ from sodium hydroxide solutions by Kelex 100, an alkylated hydroxyquinoline, in kerosene has been carried out under differing conditions. It is shown that these metals are extracted effectively from alkaline solutions by Kelex 100.

In Hydrometallurgy, 16 (1986), pp. 315–324 "Solvent Extraction of Galium III from Sodium Hydroxide Solution by Alkylated Hydroxyquinoline." T. Sato and H. Oishi, the distribution equilibria and kinetics of the extractions of Gallium III from sodium hydroxide solutions by 7-(5,5,7,7-tetramethyl-1-octen-3-yl)-8-hydroxyquinoline, Kelex 100, designated HQ, in kerosene have been examined under various conditions. From the dependence of the distribution coefficient on the concentrations of aqueous hydroxide and Kelex 100 it is deduced that the extraction can be expressed as Ga-$(OH)_4(a) + 3HQ(o) \rightleftharpoons GaQ_3(a) + OH^-(a) + 3H_2O(a)$. Furthermore, the kinetic results suggest that Ga(III) is taken up through the formation of either of two different activated species, $Na^+[Ga(OH)_3]$, OH and $Na^+ \cdot Na^+[Ga(OH)_3]$, depending on the concentration of sodium hydroxide in the aqueous phase.

In Journal Inorganic Nuclear Chemistry, 24, pp. 321–327, (1964), "Extraction of In (III) and Ga (III) From Aqueous Chloride Media By Long Chain Alkyl Amines and Quaternary Salts." M. L. Good and F. F. Holland, Jr., the extraction of $Ga^{+3}$ and $In^{+3}$ from aqueous chloride systems by long chain alkyl amines and high molecular weight quaternary salts in organic solvents has been studied using tracer techniques. The effects observed with respect to change in organic diluent, amine type and acid concentration in the aqueous phase, parallel those seen previously during similar investigations of aqueous chloride systems of $Co^{+2}$ and $Fe^{+3}$. However, the $In^{+3}$ system appears to be unique in that the stoichiometry of the extracted species in the case of a tertiary amine seems to be different from that obtained with a quaternary salt. The results indicate that the ratio of amine to $In^{+3}$ is 2:1 in the extracted species obtained with tertiary amines and is 1:1 for the quaternary salt solutions. An extracted species for $Ga^{+3}$ containing a $GaCl^{4-}$ entity is indicated in both amine and quaternary salt systems.

In Journal Inorganic Nuclear Chemistry, 27, pp. 2429–2436, (1965), "Analysis Of the Halide Complexes of Fe (III), Co(II), Ga (III) And In(III) Extracted From Aqueous Chloride Media By High Molecular Weight Substituted Alkyl Ammonium Compounds, M. L. Good and S. C. Srivastava, a complete analysis (including infra-red spectroscopy) has been made on the organic extract solutions obtained when $Fe^{+3}$, $Co^{+2}$, $Ga^{+3}$ or $In^{+3}$ is extracted from aqueous chloride solutions by a high molecular weight quaternary ammonium salt or an amine hydrochloride in an inert diluent. The results are compared with the deductions make about the nature of the extracted metal entities from equilibrium extraction data. For these metals it is shown that the extracted entity contains the tetrahedral tetrachloride anion in all cases. No evidence is found for extraction of acidic metal-chloride species.

In Solvent Extraction and Ion Exchange, 2 (2), pp. 201–212 (1984), "Liquid-Liquid Extraction of Gallium (III) From Hydrochloric Acid Solutions By Organophosphorus Compounds And High Molecular Weight Amines", T. Sato, T. Nakamura and S. Ishikawa, the extraction of $Ga^{+3}$ from hydrochloric acid solutions has been investigated using organophosphorus compounds (tributylphosphate, trioctylphosphine oxide and di-(2-ethylhexyl)-phosphoric acid) and high molecular weight amine (trioctylamine and trioctylmethylammonium chloride). The equilibrium expressions are proposed on the basis of the distribution data.

In Hydrometallurgy, 4, pp. 285–290, (1979), "Liquid-Liquid Extraction of Gallium By Tri-n-Butyl Phosphate", A. DeSchepper, the recovery of gallium from discarded germanium plant solutions by solvent extraction with tri-n-butyl phosphate (TBP) has been investigated. Because of the high content of iron, selective extraction of gallium with undiluted TBP is not possible, but suitable conditions are obtained by diluting the TBP with an aliphatic hydrocarbon and extracting at an acidity of 4M. It is advantageous to reduce the $Fe^{+3}$ in the initial solution to $Fe^{+2}$. Scrubbing of the loaded organic phase with HCl also increases the final Ga/Fe ratio. Gallium can then be recovered from the strip solution by hydrolysis.

DESCRIPTION OF THE INVENTION

Figure 1:
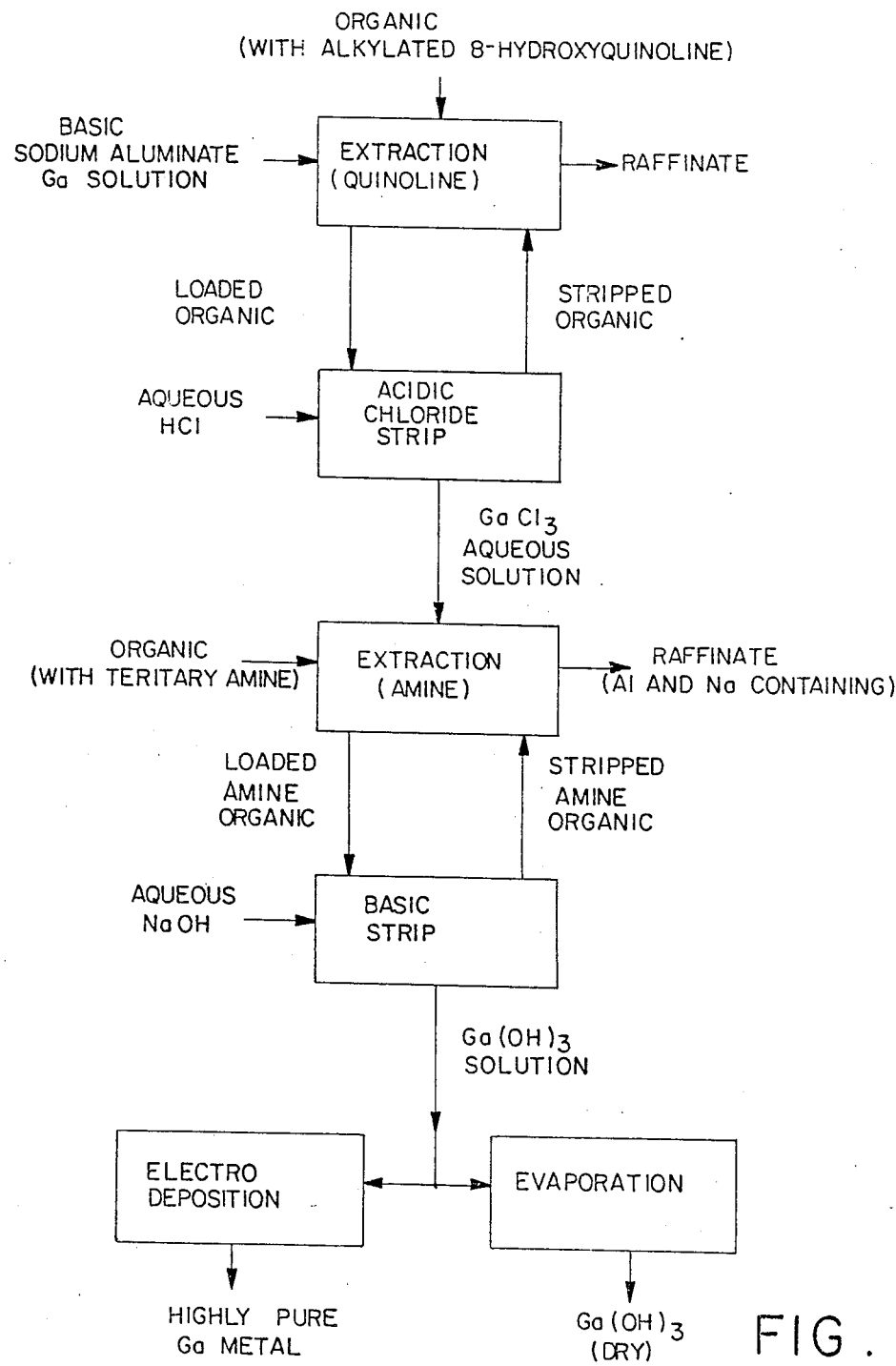
FIG. 1 is a diagrammatic representation of an overall process of recovery of gallium from aqueous solutions thereof, employing a liquid-liquid system.

Other than in the operating examples, or where otherwise indicated, all numbers expressing quantities of ingredients or reaction conditions used herein are to be understood as modified in all instances by the term "about".

An improved process for the recovery of gallium has been found which provides for a high yield of recovery of the gallium in a highly pure form. The overall process can be seen from FIG. 1, which illustrates the process employing a sodium aluminate solution containing gallium values. Such a sodium aluminate solution is one which arises from the Bayer process for recovery of aluminum from bauxite ores. The present invention is particularly applicable to treatment of such solutions; however, other aqueous solutions containing gallium may be employed as a feed solution in the practice of the present invention. The invention is particularly applicable to highly basic or alkaline aqueous solution containing gallium values and other metal values such as aluminum.

As can be seen from the drawing, the aqueous sodium aluminate solution containing gallium is contacted with an organic phase containing an 8-hydroxyquinoline, more fully specified hereinafter, which is an extractant for the gallium, sodium and aluminum metal values. The hydroxyquinoline extractant, which is substantially water insoluble, is dissolved in an organic solvent which is substantially water insoluble and immiscible. The organic solvent containing the hydroxyquinoline extractant forms an organic phase, which after contact with the aqueous feed solution for a sufficient time to complex with the gallium, aluminum and sodium, so to extract these metals from the aqueous solution into the organic phase, can be separated from the aqueous phase due to immiscibility. After this first extraction and separation of the phases the loaded organic phase is then contacted with an aqueous acidic scrub or strip solution, which removes or strips the metal values from the organic phase into the aqueous acidic strip solution. After separation of the organic phase it is returned for reuse to the extraction stage. The aqueous acidic solution, shown as an aqueous HCl solution in the drawing, contains the gallium in the form $GaCl_3$. This solution also contains the sodium and aluminum, and is then subjected to a second extraction with an organic phase comprised of a water insoluble and immiscible organic solvent, more fully specified hereafter, containing an amine extractant which will be specified more fully hereafter. In this extraction the gallium is extracted from the aqueous acidic phase into the amine organic phase leaving the sodium and aluminum values in the aqueous raffinate stage for later processing in relation to the aluminum. After this second extraction and separation from the aqueous phase the gallium loaded organic phase is then contacted with an aqueous basic solution, shown in the drawing as an aqueous NaOH solution. The basic alkaline solution removes or strips the gallium from the organic phase containing the amine. The stripped amine containing organic is then recycled for reuse in another extraction stage. The gallium, now present as $Ga(OH)_3$ in the alkaline aqueous hydroxide solution, can then be recovered in either of two ways, shown in the drawing as (a) electrodeposition or (b) evaporation. The electrodeposition is the preferred mode of operating providing a highly pure gallium metal. In the evaporation, a dry $Ga(OH)_3$ form is provided, which must be further treated by conventional methods, for conversion to whatever form the gallium is desired.

The process of the present invention can be described generally as a process of recovery of gallium from aqueous alkaline solutions thereof comprising:

(a) contacting the gallium containing aqueous solution with a solution of a water insoluble hydroxyquinoline compound in a water insoluble and immiscible organic solvent for a sufficient time to extract said gallium values from said aqueous solution forming two phases, an organic phase (I) containing said gallium vales and an aqueous phase (II) now barren of gallium;

(b) separating the immiscible organic phase (I) from said aqueous phase (II);

(c) contacting the organic phase (I) with an acidic aqueous solution whereby said gallium values are removed or extracted from said organic phase (I) into said aqueous acidic chloride solution phase (III);

(d) separating said organic phase (I) now barren of gallium from said aqueous acidic solution phase (III);

(e) contacting said aqueous phase (III) with a solution of a water insoluble amine compound in a water insoluble and immiscible organic solvent for a sufficient time to extract said gallium values from said aqueous phase (III) forming an organic phase (IV) now containing said gallium values and an aqueous phase (V) now barren of gallium;

(f) separating said organic phase (IV) from said aqueous phase (V); and (g) contacting said organic phase (IV) with an aqueous alkaline solution to remove and extract said gallium from said organic phase (IV) into said aqueous alkaline solution phase forming aqueous phase (VI) now containing said gallium values;

(h) separating said aqueous phase (VI) from said organic phase (IV) row barren of said gallium values and (i) recovering said gallium values from said aqueous alkaline solution phase (VI).

The gallium values are recovered from said aqueous alkaline solution, phase (VI) either by dehydration or evaporation to a dry, solid form, usually the hydroxide, or by electrodeposition from the solution providing highly pure gallium metal.

Gallium is known to be present in bauxites in contents varying from 0.002 to 0.0%, corresponding to Al/Ga ratios of 8000 to 3000:1. In the course of the Bayer cycle for producing alumina, gallium is also known to concentrate progressively in the sodium aluminate solutions until an equilibrium is reached with the Al/Ga ratio of the solutions at approximately 400 to 150:1. The sodium aluminate solutions, which are available in very large quantities, are thus a first-class raw material for gallium in cases where industrial quantities are required, since there is no ore of this metal. Accordingly the present invention finds utility with respect to very basic solutions, particularly to sodium aluminate solution from the Bayer process.

The very basic (alkaline pH) solutions treated by the methods described are notably those in which the OH-concentration may be as high as 13-14 g ions /l. Thus, the caustic sodium aluminate lyes from the Bayer process, which are preferably treated by this method, generally have a composition corresponding to:

$Na_2O$: from 100 to 400 g/l $Al_2O_3$ from 40 to 150 g/l while the so-called "decomposed" caustic solutions typically display such compositions as:

$Na_2O$: from 150 to 200 g/l $Al_2O_3$ from 70 to 100 g/l

As indicated earlier and shown in the drawing the first step of the process comprises extraction of the gallium values from said aqueous basic solution by contact with an organic phase which is water insoluble or immiscible so the aqueous and organic phases may be physically separated. While ideally the phases are mutually insoluble and immiscible in each other, as a practical matter the phases are substantially insoluble and immiscible, and must be so to the extent necessary to be physically separable, one from the other.

The organic phase is comprised of an organic solvent, water insoluble and immiscible as discussed above, which contains a solvent soluble hydroxyquinoline capable of extracting gallium by means of complexing under the conditions of the invention. The hydroxyquinolines employed must be more soluble in the organic phase than in the aqueous phase and in this sense is considered water insoluble, as used herein.

As indicated, the hydroxyquinoline is dissolved in a water immiscible organic solvent which comprises the organic extractant phase into which the gallium is extracted or transferred from the aqueous basic feed solution. In the first extraction step, a portion of the sodium and aluminum values present will also be extracted or transferred from the aqueous feed into the organic phase Any substantially water immiscible liquid solvent can be used for solution of the hydroxyquinoline. The same water-immiscible solvents are used for the second extracting step shown in the drawing using an amine extractant organic solution in subsequent extraction from the aqueous acidic strip solution. Typically the solvents are the aliphatic and aromatic hydrocarbons. Aliphatic hydrocarbons such as alkanes, including cycloalkanes and halogenated alkanes are suitable. Preferred alkanes have a minimum of five carbon atoms. Preferred halogenated alkanes have a minimum of two carbon atoms. Aromatic hydrocarbons which can be used include benzene, and substituted products such as toluenes, xylenes and cumene. Also suitable as solvents are those esters, ethers, ketones, and alcohols which are substantially water immiscible. Furthermore, any blend of these substances or a water immiscible kerosene is also suitable. Preferred organic solvents are the aliphatic hydrocarbons having flash points of 150° F. and higher and solubilities in water of less than 0.1% by weight. These solvents are chemically inert and the costs thereof are currently within practical range-i.e. normally about $1.00 (U.S.) per gallon. Representative commercially available solvents are: Kermac 470B (an aliphatic kerosene available from Kerr-McGee, Flash Point, 175° F.); Kermac 400-500, an aliphatic kerosene similar to Kermac 470B having a Flash Point of 180° F.; Chevron Ion Exchange Solvent (available from Standard Oil of California; Flash Point, 195° F.); Escaid 100 and 110 (available from Exxon-Europe, Flash Point, 180° F.); Exxsol D 80, available from Exxon USA corresponds to Escaid 110 ; Norpar 12 (available from Exxon-U.S.A., Flash Point, 160° F.); Conoco C-1214L (available from Conoco, Flash Point, 160° F.); Aromatic 150 (an aromatic kerosene available form Exxon-U.E.A., Flash Point 150° F. and various other kerosenes and petroleum fractions from other oil companies.

Modifiers can be added to the solvent in addition to the extractant in order to modify or improve the extraction of the gallium. Substances, which are preferred as modifiers are alcohols in the range of from about 10 to about 13 carbon atoms and phenols such as the alkyl (8-12 carbon atom) substituted phenols, which can be added to improve extraction, phase eeparation and/or other important characteristics of the organic solution. When typically employed in the amine extraction step the modifier, such as tridecanol will be employed in amounts up to the amount by weight of the amine in the organic solution.

The hydroxyquinolines, preferably are substituted hydroxyquinolines, which are water insoluble, such as the alkylated 8-hydroxyquinolines, which may ideally be represented by the formula

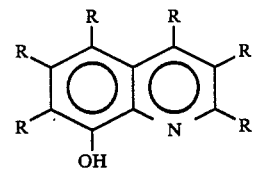

where R is H, a halogen or a hydrocarbon group containing from 8 to 22 carbon atoms. The preferred 8-hydroxyquinolines are those in which the hydrocarbon group contains from 10-14 carbon atoms, most preferably 12 carbon atom, which group is located in the 7-position. If the hydroxyquinoline contains a halogen substituent, the substituent is either bromine, or preferably chlorine, preferably located in the 7-position. Thus, the preferred 8-hydroxyquinolines useful in the present invention, are those having the structural formula

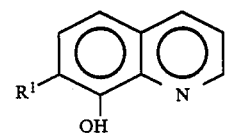

which may also contain a Cl substituent in the 5-position. The $R^1$ group is an aliphatic hydrocarbon group unsaturated or saturated, containing 12 carbon atoms such as 7-dodecenyl, 7-trisobutenyl, or 7-tetrapropylenyl, the latter being a hydroxyquinoline sold by Henkel Corporation under the name LIX 26. The compound, 7-(5,5,7,7-tetramethyl-1-octene-3-yl) 8-hydroxyquinoline is disclosed in U.S. Pat. No. 3971843, noted earlier, as the active substance in KELEX 100 and KELEX 120. Other suitable 8-hydroxyquinolines can be seen in the U.S. Pat. Nos. 3,637,711, 4,241,029, 4,169,130 and the various papers discussed earlier above.

The amount of substituted hydroxyquinoline in the organic phase is not critical and may vary between wide limits. However, the hydroxyquinoline will be present in an amount of 2–75% by weight of the organic phase, preferably about 5–20%. On a volume basis this will generally be between 1–50%, preferably 5–15%. The concentration should be sufficient to extract the metal values from the aqueous phase and accordingly a ratio of hydroxyquinoline to metal concentration of 3:1 on a molar basis is acceptable. Generally a slight excess, i.e. 3.6:1 will be employed.

The process will generally be conducted at ambient temperatures and pressures. However, elevated pressures and temperatures may be employed. As a practical matter a temperature of 10–50° C. will produce satisfactory results. The nature of the atmosphere in which the process is carried out also is not critical. If it is necessary or desirable to avoid or minimize degradation of the extracting agent, the extraction and stripping steps may be carried out under an inert atmosphere, such as nitrogen or argon.

The respective volumes of the aqueous and organic phases in the various extraction and stripping steps are generally determined by the individual needs of the systems, such as the type of system and equipment employed, and respective concentration of the solutions. The organic (0) to aqueous (A) volume ratios can acceptably vary from 1:20 to 20:1. More desirably, an effective range of organic to aqueous (O/A) is 1:5 to 5:1 and commercial systems will preferably employ a ratio of 1:3 to 3:1.

The process as illustrated in the drawing contemplates a continuous, countercurrent process in which organic is cycled for reuse. The process may however be carried out as a batch process.

The organic extractant phase should contact the aqueous metal containing phase for a sufficient length of time to permit entry or transfer of the extracted material into the organic phase. The time of contact depends on the particular system, the type of equipment used, and upon individual needs and desires. As a general rule, however, the contact time between the organic extractant solution and the aqueous solution should be in excess of 0.1 seconds with some equipment, but generally less than 3 hours. Naturally a minimum contact time is desired, thus a more desirable phase contact time would be in the range of from about 5 seconds to one hour while a more preferred contact time is from about 5 seconds to about 10 minutes.

After the metals have been extracted or transferred into the organic phase, the two phases may be separated by any convenient means for a liquid/liquid phase separation. Representative but non-exhaustive examples of means for achieving phase separations are: gravity settlers and centrifuges. Generally, any system used to separate different liquid phases can be used.

The aqueous raffinate phase, now barren of the gallium, but still containing substantial sodium and aluminum which was present along with the gallium, is directed back to the Bayer process. The hydroxyquinoline extractant organic phase, now containing the gallium, and any extracted sodium and aluminum, is then contacted with an aqueous acidic solution so as to strip or scrub the metal values (Ga, Na and Al) from the organic phase. The stripped organic, now barren of metals is then recycled back for reuse in the extraction of fresh aqueous feed.

The aqueous acidic stripping solution is a dilute solution of a strong acid such as hydrochloric, hydrobromic and the like. A concentration of above 0.5N will be sufficient. As the gallium is generally desired in the form of the chloride ($GaCl_3$) for subsequent treatment it is preferable to use hydrochloric acid. Generally, a 1.5–2.5N solution of hydrochloric acid will be employed.

The aqueous acidic strip solution, now containing the metal values, is then subjected to a second extraction step employing an amine extractant dissolved in an organic solvent, generally the same or equivalent organic solvent employed in the first extraction step. The organic solvents employed, and the condition employed in this extraction are substantially the same as earlier described hereinabove.

The tertiary amines useful in the extraction may be generally described as water-insoluble tertiary amines containing aliphatic, araliphatic or aromatic hydrocarbon groups and having at least 18, and preferably, 20 carbon atoms. Amines having less than 20 carbon atoms tend to be less soluble in the organic solvent or diluent in which they are dissolved to form the organic extractant phase, and tend to be too soluble in the aqueous phase from which the metals are to be extracted.

The preferred tertiary amines may be ideally defined by the formula

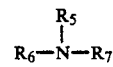

where $R_5$, $R_6$ and $R_7$ individually are aliphatic, araliphatic or aromatic hydrocarbon groups containing from 1–22 carbon atoms with the total number of carbon atoms in groups $R_5$, $R_6$ and $R_7$, being at least 18 or 20, and preferably at least 24. Groups which are aliphatic hydrocarbon groups are preferred with those containing at least 8 carbon atoms being more desirable. High purity ion-pair extractants commercially available from Henkel Corporation are: ALAMINE® 300 (tri-n-octylamine), ALAMINE 308 (triisoctylamine), ALAMINE 336 (tri-$C_8C_{10}$ amine), ALAMINE 310 (triisodecylamine) and ALAMINE 304 (tri-laurylamine). Of these, the ALAMINE 336 is preferred for use in the present invention.

The quaternary ammonium compounds may be employed as the amine extractant. The quaternary ammonium compounds having a total of at least 19 or 21, and preferably 25 carbon atoms, preferably those having a quaternary ammonium ion of the formula:

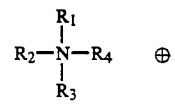

where $R_1$, $R_2$, $R_3$ and $R_4$ individually are aliphatic, araliphatic or aromatic hydrocarbon groups containing from about 1 to about 22 carbon atoms and where $R_1$, $R_2$, $R_3$ and $R_4$ together have a minimum of at least 19, and preferably, 25 carbon atoms, and where at least three of the four R groups have at least 4 carbon atoms.

The anion portion of the quaternary will generally be the chloride or sulfate. The methyltri ($C_8$-$C_{10}$) ammonium chloride is available commercially from Henkel Corporation. Other quaternary compounds are those tertiary amines noted earlier, which have been quaternized in conventional manner so as to contain a methyl group in addition to these contained in the tertiary amine.

After the extraction with the amine, the two phases are again separated, the amine organic phase now containing the Ga metal values and the aqueous raffinate phase now containing the aluminum values, along with the sodium values. The aluminum and sodium containing aqueous phase may then be processed further in a conventional manner. The amine organic phase, now pregnant with the gallium, is then contacted with an aqueous alkaline solution to strip the gallium from the organic phase, transferring the gallium to the aqueoss alkaline solution. The now barren amine organic phase is then recycled back to the extraction unit for reuse.

The preferred aqueous alkaline solution is a sodium hydroxide solution of a concentration sufficient to form the gallium hydroxide Ga(OH)$_3$. Other alkaline materials, preferably the hydroxides, may be employed such as KOH, aqueous anmonia and Na$_2$CO$_3$. The hydroxide form is preferred as the gallium is conveniently recovered therefrom by electrodeposition which will provide a high pure gallium metal, i.e. 99.9% purity. The Ga(OH)$_3$ solution may be simply dehydrated by evaporation to a dry form of Ga(OH)$_3$.

The following examples serve to illustrate, but not limit, the invention. All parts and percentages are by weight, unless otherwise noted. Materials employed therein include:

LIX®26: 7-tetrapropylenyl-8-hydroxyquinoline available from Henkel Corporation.

VERSATIC®911: a mixture of saturated tertiary, monocarboxylic acids of the formula R$_1$R$_2$CH$_3$C-COOH where R$_1$ and R$_2$ are hydrocarbon groups containing 6, 7, or 8 carbon atoms total for the two groups and which are produced by means of the oxo synthesis from C$_9$-C$_{11}$ olefins, and which are available from Shell Chemicals.

VERSATIC®10: Similar to VERSATIC® 911, but derived from C$_{10}$ olefins

KERMAC®500 T: An aliphatic kerosene having a flash point of about 180° F. available from Kerr McGee.

ESCAID®110: An aliphatic kerosene having a flash point of about 180° F. available from Exxon-Europe ALKAMINE®308: tri-isooctyl amine available from Henkel Corporation.

ALKAMINE 336: tri-($C_8$-$C_{10}$) amine available from Henkel Corporation.

ADOGEN®283: a di-$C_{13}$ branched alkyl amine available from Sherex

EXXON 150: An aromatic kerosene having a flash point of about 150° F. available from Exxon - U.S.A.

KERMAC 400-500: An aliphatic kerosene having a flash point about 180° F. available from Kerr McGee.

EXAMPLE 1

An organic solution containing 13.7 w/w% LIX 26, 2 w/w% Versatic 911, 10 w,w% decyl alcohol and 74.3 w/w% Kermac 500T was contacted with a highly caustic aqueous solution containing 240g/l NaOH, 124.8 g/l Al(OH)$_3$ and 0.25 g/l Ga at an O/A ratio of 1:1. The temperature was 50° C. The solutions were mixed for thirty minutes. Samples of the emulsion were taken at 1 minute, 2 min., 5 min., 10 min., 15 min., and 30 minutes. The aqueous portion of the emulsion was analyzed for gallium. The remaining portion of loaded organic was filtered through phase separation paper and then contacted with 2N HCl at a 1/1 organic to aqueous (O/A). The tests were run at room temperature (about 23° C.) and samples of the emulsion were taken at 1 min., 2 min., 5 min., 10 min., 20 min., 40 min., and 60 minutes. The aqueous was analyzed for gallium and aluminum.

| LIX 26 Extraction Test | | LIX 26 Stripping Test | | |
|---|---|---|---|---|
| Time | g/l Ga | Time | g/l Ga | g/l Al |
| 1 min | 0.21 | 1 min | 0.15 | 0.4 |
| 2 min | 0.17 | 2 min | 0.15 | 0.5 |
| 5 min | 0.12 | 5 min | 0.15 | 0.6 |
| 10 min | 0.10 | 10 min | 0.15 | 0.6 |
| 15 min | 0.09 | 20 min | 0.15 | 0.7 |
| 30 min | 0.09 | 40 min | 0.15 | 0.8 |
| Feed | 0.25 | 60 min | 0.15 | 0.7 |

The remaining HCl strip solution containing the gallium and aluminum was contacted with an organic solution consisting of 1 v/v% Alkamine 308 in Exxon 150. Initially, the organic solution was protonated with dilutsulfuric acid, then the protonated organic was contacted with the HCl I strip solution at a 1,1 O/A ratio for 5 minutes. The amine was filtered and then contacted with 1NaOH at a 1/1 O/A for 5 minutes. The aqueous was analyzed for gallium and aluminum.

| | g/l Ga | g/l Al |
|---|---|---|
| HCl strip solution | 0.16 | 0.60 |
| HCl raffinate | N.D. | 0.60 |
| NaOH strip solution | 0.16 | N.D. |

EXAMPLE 2

The goal of this experiment was to generate a gallium pregnant solution. A feed solution containing 0.40 g/l gallium, 0.62 g/l Al and 2N HCl was prepared. An organic solution of 20 g/l Alamine 336, 2 v/v% tridecyl alcohol in Kermac 400-500 was prepared and protonated with dilute sulfuric acid. The feed solution was contacted with the organic at a 1/10 O/A ratio for 2 minutes. A portion of the aqueous was saved ior analysis. The organic was filtered through phase separation paper and then contacted with 1N NaOH at a O/A ratio of 10/1 for two minutes. The aqueous was analyzed for gallium and aluminum.

| | g/l Ga | g/l Al |
|---|---|---|
| 2N HCl Feed | 0.40 | 0.62 |
| 2N HCl Raffinate | 0.33 | 0.62 |
| 1N NaOH strip | 0.70 | N.D. |

EXAMPLE 3

In this experiment, 13.7 w/w % Kelex 100 plus 5 w/w % Versatic acid 10 and 10 w/w % decyl alcohol diluted in Escaid 110 was contacted w[th a synthetic Bayer solution at a 1/1 O/A. The organic phase was filtered and split into two portions. One portion was oontacted with 2N HCl at a 1/1 O/A for 10 minutes and the other portion was contacted with 6N HCl at a 1/1 O/A for 10 minutes. Both aqueous phases were then filtered and each sample was divided into two portions. One portion of the 2N HCl strip solution was contacted with 20 g/l Adogen 283 plus 2 v/v% decyl alcohol in Escaid 110 at a 1/1 O/A for 5 minutes and the other portion owas contacted with 20 g/l Alamine 336 plus 2 v/v% decyl alcohol in Escaid 110 at 1/1 O/A for 5 minutes. These procedures were repeated using the 6N HCl strip solution. Afterwards, the gallium loaded amines were contacted with 1N NaOH at 5/1 O/A's for 3 minutes. All the aqueous samples were analyzed for Ga and some for both gallium and aluminum. The results are as follows.

Synthetic Bayer feed liquor = 0.23 g/l Ga
Bayer raffinate = 0.08 g/l Ga

|  | g/l Ga | g/l Al |
|---|---|---|
| Adogen 283 Loading and Stripping | | |
| 2N HCl strip aqueous feed | .20 | |
| 2N HCl strip aqueous raffinate | .20 | .17 |
| 1N NaOH strip aqueous | .025 | N.D. |
| 6N HCl strip aqueous feed | .015 | |
| 6N HCl strip aqueous raffinate | .013 | .17 |
| 1N NaOH strip aqueous | .014 | N.D. |
| Alamine 336 Loading and Stripping | | |
| 2N HCl strip aqueous feed | .20 | |
| 2N HCl strip aqueous raffinate | .09 | .17 |
| 1N NaOH strip aqueous | .78 | N.D. |
| 6N HCl strip aqueous feed | .015 | |
| 6N HCl strip aqueous raffinate | .013 | .17 |
| 1N NaOH strip aqueous | .023 | N.D. |

The foregoing example shows the usefulness of the tertiary amine in contrast to the poor performance of a secondary amine.

EXAMPLE 4

In this experiment, 13.7 w/w% Kelex 100plus 5 w/w% Versatic acid 10 and 10 w/w% decyl alcohol diluted in Escaid 110 was contacted with a synthetic Bayer solution at a 1/1 O/A. The organic phase was filtered and then contacted with 2N HCl at a 1/1 O/A. The aqueous phase was filtered and then contacted with 20 g/l Alamine 336 plus 2 v/v% isodecanol in Escaid 110 (the organic was protonated with 1N HCl) at a 1/1 O/A. The amine was filtered and then contacted with 1, 2, 3 and 4N solutions of NaOH at 20/1 O/A's. All the aqueous phases were analyzed for Ga. The results are as follows:

| Aqueous Phase | g/l Ga |
|---|---|
| Bayer feed stock | 0.441 |
| Bayer raffinate | 0.107 |
| 2N HCl strip aqueous feed | 0.312 |
| 2N HCl strip aqueous raffinate | 0.125 |
| *1N NaOH | .13 |
| 2N NaOH | 3.52 |
| 3N NaOH | 3.41 |
| 4N NaOH | 3.50 |

*overnight, precipitate formed

I claim:
1. A process for the recovery of gallium from an aqueous solution thereof comprising:
(a) contacting the gallium containing aqueous solution with a solution of a water insoluble hydroxyquinoline compound in a water insoluble and immiscible organic solvent for a sufficient time to extract and transfer said gallium values from said aqueous solution forming two phases, an organic phase (I) containing said gallium values and an aqueous phase (II) now barren of gallium;
(b) separating the immiscible organic phase (I) from said aqueous phase (II);
(c) contacting the organic phase (I) with an acidic aqueous solution whereby said gallium values are removed or extracted from said organic phase (I) into said aqueous acidic solution;
(d) separating said organic phase (I) now barren of gallium from said aqueous acidic uolution phase (III);
(e) contacting said aqueous phase (III) with a solution of a water insoluble amine compound in a water insoluble and immiscible organic solvent for a sufficient time to extract said gallium values from said aqueous phase (III), forming an organic phase (IV) now containing said gallium values and an aqueous phase (V) now barren of gallium;
(f) separating said organic phase (IV) from said aqueous phase (V); and
(g) contacting said organic phase (IV) with an aqueous alkaline solution to remove and extract said gallium from said organic phase (IV) into said aqueous alkaline solution forming aqueous phase (VI) now containing said gallium values;
(h) separating said aqueous phase (VI) from said organic phase (IV) now barren of said gallium values and
(i) recovering said gallium values from said aqueous alkaline solution phase (VI).

2. A process as defined in claim 1 wherein said gallium is recovered from said aquecus alkaline solution, phase (VI) by electrodeposition.

3. A process as defined ir claim 1 wherein said aqueous alkaline solution in step (g) is an aqueous solution of sodium hydroxide and said gallium values are contained in aqueous phase (VI) as Ga(OH)$_3$ and said gallium is recovered therefrom by evaporation of said aqueous alkaline solution to provide dry Ga(OH)$_3$.

4. A process as defined in claim 1 wherein said aqueous solution containing gallium is a basic solution also containing sodium and aluminum, derived from the production of aluminum by the Bayer process.

5. A process as defined in claim 4, wherein at least a portion of said sodium and aluminum is transferred along with said gallium in step (a) into said organic phase (I) and transferred along with said gallium in step (c) into said aqueous acidic solution forming aqueous phase (III), and said sodium and aluminum are retained in said aqueous phase (III) in step (e) so as to separate said aluminum and sodium from said gallium.

6. A process as defined in claim 1 wherein hydroxyquinoline is an 8-hydroxyquinoline.

7. A process as defined in claim 6 in which 8-hydroxyquinoline has the formula

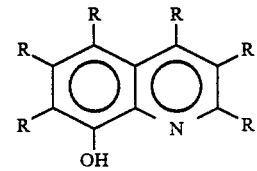

Where R is H, halogen or a hydrocarbon group containing 8 to 22 carbon atoms.

8. A process as defined in claim 6 in which said 8-hydroxyquinoline has the formula

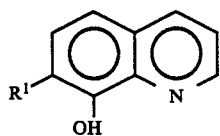

where $R^1$ is a saturated or unsaturated aliphatic hydrocarbon group containing 8–22 carbon atoms.

9. A process as defined in claim 8 in which $R^1$ contains 12 carbon atoms.

10. A process as defined in claim 9 in which $R^1$ is tetrapropylenyl.

11. A process as defined in claim 9 in which the 8-hydroxyquinoline is also substituted in the 5-position with Cl.

12. A process as defined in claim 1 in which said water insoluble and immiscible organic solvent is an aliphatic or aromatic hydrocarbon.

13. A process as defined in claim 12 wherein said solvent is kerosene.

14. A process as defined in claim 1 in which said amine compound in step (e) is a tertiary amine having the formula

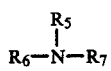

where $R_5$, $R_6$ and $R_7$ individually are aliphatic, araliphatic or aromatic hydrocarbon groups containing from 1–22 carbon atom and the total number of carbon atoms in groups $R_5$, $R_6$ and $R_7$ is at least 18.

15. A process as defined in claim 14 in which said amine is selected from the group corsisting of tri-n-octylamine, tri-isoctylamine, tri-isodecylamine, tri-laurylamine and tri-($C_8$–$C_{10}$) amine.

16. A process as defined in claim 1 in which said amine compound in step (e) is a quarternized amine having a quaternary ammonium ion of the formula

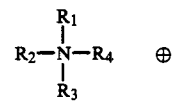

wherein $R_1$, $R_2$, $R_3$ and $R_4$ individually are aliphatic, araliphatic or aromatic hydrocarbon groups containing from to 22 carbon atoms and where $R_1$, $R_2$, $R_3$ and $R_4$ together have a minimum of at least 19 carbon atoms and at least three of the four R groups have at least 4 carbon atoms.

17. A process as defined in claim 16 in which one of the R groups, $R_1$, $R_2$, $R_3$ and $R_4$, is methyl and the remaining three groups are alkyl groups containing 8 or 10 carbon atoms.

18. A process as defined in claim 1 wherein said hydroxyquinoline is an 8-hydroxyquinoline substituted in the 7-position with an aliphatic hydrocarbon group containing 12 carbon atoms, said water insoluble and immiscible organic solvent in steps (a) and (e) is kerosene and said amine compound in step (e) is tri-($C_8$–$C_{10}$) amine.

19. A process as defined in claim 18 wherein said aliphatic hydrocarbon group containing 12 carbon atoms is tetrapropylenyl.

20. A process as defined in claim 18 wherein said aliphatic hydrocarbon group containing 12 carbon atoms is triisobutenyl.

* * * * *